United States Patent [19]

Saito et al.

[11] 4,416,004

[45] Nov. 15, 1983

[54] ROTARY RECORDING MEDIUM REPRODUCING APPARATUS HAVING A LID MEMBER GUIDING MECHANISM

[75] Inventors: Takashi Saito, Ayase; Takashi Kumaki, Sagamihara, both of Japan

[73] Assignee: Victor Company of Japan, Ltd., Yokohama, Japan

[21] Appl. No.: 294,304

[22] Filed: Aug. 19, 1981

[30] Foreign Application Priority Data

Aug. 20, 1980 [JP] Japan ............................ 55-117738[U]

[51] Int. Cl.³ ............................................ G11B 25/04
[52] U.S. Cl. ................................................. 369/77.2
[58] Field of Search ............................................ 369/77

[56] References Cited

U.S. PATENT DOCUMENTS

| | | |
|---|---|---|
| 4,113,262 | 9/1978 | DeStephanis ........................ 369/77 |
| 4,133,540 | 1/1979 | Torrington . | |
| 4,168,835 | 9/1979 | Omiya et al. ......................... 369/77 |

FOREIGN PATENT DOCUMENTS

| | | |
|---|---|---|
| 3104038 | 4/1982 | Fed. Rep. of Germany . |
| 2015234A | 9/1979 | United Kingdom . |
| 1596624 | 8/1981 | United Kingdom . |

Primary Examiner—Steven L. Stephan
Attorney, Agent, or Firm—Louis Bernat

[57] ABSTRACT

A rotary recording medium reproducing apparatus reproduces a rotary recording medium accommodated within a case, where the case has a jacket provided with a space for accommodating the rotary recording medium and an opening through which the rotary recording medium can enter and leave the jacket, and a lid member inserted through the opening of the jacket for closing the opening. The rotary recording medium reproducing apparatus comprises an inserting opening through which the case or an empty jacket is inserted, a turntable for rotating the rotary recording medium left within the reproducing apparatus when an operation is performed in which the case is inserted into the reproducing apparatus and then the jacket is pulled out from the reproducing apparatus, a lid member locking mechanism provided at an innermost part of the reproducing apparatus for locking and leaving the lid member within the reproducing apparatus when an operation is performed in which the case is inserted into the reproducing apparatus and then pulled out from the reproducing apparatus, and a lid member guiding mechanism for guiding the lid member locked by the lid member locking mechanism and left within the reproducing apparatus and correcting the position of the lid member so that the lid member opposes the opening of the jacket at an intermediate point of insertion of an empty jacket, when the empty jacket is inserted into the reproducing apparatus to recover the rotary recording medium within the reproducing apparatus into the jacket.

5 Claims, 6 Drawing Figures

ROTARY RECORDING MEDIUM REPRODUCING APPARATUS HAVING A LID MEMBER GUIDING MECHANISM

BACKGROUND OF THE INVENTION

The present invention generally relates to rotary recording medium reproducing apparatuses capable of placing and leaving a rotary information recording medium in a state possible for reproduction within the reproducing apparatus when a jacket having a lid member for accommodating the recording medium therein is inserted into and then pulled out from within the reproducing apparatus, and also capable of incasing the recording medium within the jacket so that the recording medium can be obtained outside the reproducing apparatus together with the jacket, when the empty jacket is inserted into and then pulled out from within the reproducing apparatus. The present invention more particularly relates to the above type of a rotary recording medium reproducing apparatus provided with a lid member guiding mechanism for guiding the lid member within the rotary recording medium reproducing apparatus so that the lid member enters into an opening of the jacket, when the empty jacket is inserted into the rotary recording medium reproducing apparatus to recover the rotary recording medium inside the rotary recording medium reproducing apparatus within the jacket.

Conventionally, in an apparatus for reproducing a rotary recording medium (referring to a video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a jacket (disc case) which has a lid and accommodates a disc therein, from within the reproducing apparatus. As a conventional apparatus of this type, a reproducing apparatus was proposed in a U.S. patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an innermost part on the opposite side from the inserting opening with respect to the turntable, a jacket opening enlarging device provided in the vicinity of the inserting opening, capable of moving over the turntable between the position in the vicinity of the inserting opening and the innermost part of the reproducing apparatus, for enlarging the opening of the jacket by entering inside cutouts of the lid member upon insertion of the jacket into the reproducing apparatus through the inserting opening, lowering and raising means for lowering the disc to a position where the disc is placed on the turntable from a holding position where the disc is held by the holding means upon starting of the reproduction, and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

In the above previously proposed reproducing apparatus, the disc inside the reproducing apparatus relatively enters within the jacket from the opening of the jacket, when an empty jacket is inserted into the reproducing apparatus after completion of the reproduction. Accordingly, when the jacket is pushed and inserted into a final position within the reproducing apparatus, the disc becomes accommodated within the jacket, and the lid member which is clamped inside the reproducing apparatus closes the opening of the jacket, to become connected to the jacket.

In a case where the lid member itself is not curved and is maintained at a predetermined height position by clamping means, edge part of the lid member on the side of the turntable is at a height position opposing the opening of the jacket. Hence, the edge part of the lid member enters within the opening of the approaching jacket in a normal manner.

However, in reality, there are cases where the lid member cannot be connected to the jacket, as will be described hereinafter.

First, the lid plate is a flat-shaped member formed from a resin, and there are cases where the lid member itself is curved due to unevenness introduced upon forming of the lid member. Further, there are cases where the height position at which the lid member is clamped, is inconsistent. In a state where the edge part of the lid member inside the reproducing apparatus on the side of the turntable is separated towards the upward and downward directions from the opening of the jacket, due to these causes, there are cases where the edge part of the lid member on the side of the turntable hits the jacket upon insertion of the jacket into the reproducing apparatus. In this case, the lid member cannot enter within the opening of the jacket. Therefore, the disc cannot be recovered from within the reproducing apparatus, since it becomes impossible for the lid member to connect to the jacket.

The lid member is shaped so that the lid member projects most at the right and left end sides thereof, on the side of the turntable. Accordingly, these projecting right and left end sides of the lid member first respectively enter within the opening of the jacket at the right and left end parts of the opening. However, the opening of the jacket is enlarged in a state where the center part of the opening is enlarged the most, and the right and left end parts of the opening which first respectively receive the above lid member are not enlarged by a large amount. Therefore, in order to normally connect the lid member to the jacket, the lid member must be maintained at the height position on the jacket inserting path with high accuracy. However, by considering the manner in which the disc case is handled by the user, and the state upon actual use of the reproducing apparatus, in reality, it is difficult to always accurately maintain the height position of the lid member throughout the long period in which the reproducing apparatus is used.

Therefore, it is desirable to construct the reproducing apparatus so that the lid member can normally connect to the jacket, even when the actual height position of the clamped lid member is greatly deviated from a predetermined height position due to a curved lid member or inconsistency in the clamping state of the lid member.

SUMMARY OF THE INVENTION

Accordingly, it is a general object of the present invention to provide a novel and useful rotary recording medium reproducing apparatus having a lid member guiding mechanism, in which the above described demands have been satisfied.

Another and more specific object of the present invention is to provide a rotary recording medium reproducing apparatus provided with a lid member guiding mechanism for guiding a lid member clamped within the reproducing apparatus to correct the height position of the lid member so that the lid member opposes an opening of a jacket, when an empty jacket is inserted into the reproducing apparatus to recover a rotary recording medium. According to the apparatus of the present invention, the lid member can be positively connected to the jacket even when a relatively large inconsistency exists in the height position of the lid member within the reproducing apparatus, without interferring the operation in which the rotary recording medium is recovered.

Other objects and further features of the present invention will be apparent from the following detailed description when read in conjunction with the accompanying drawings.

DETAILED DESCRIPTION

Figure 1:
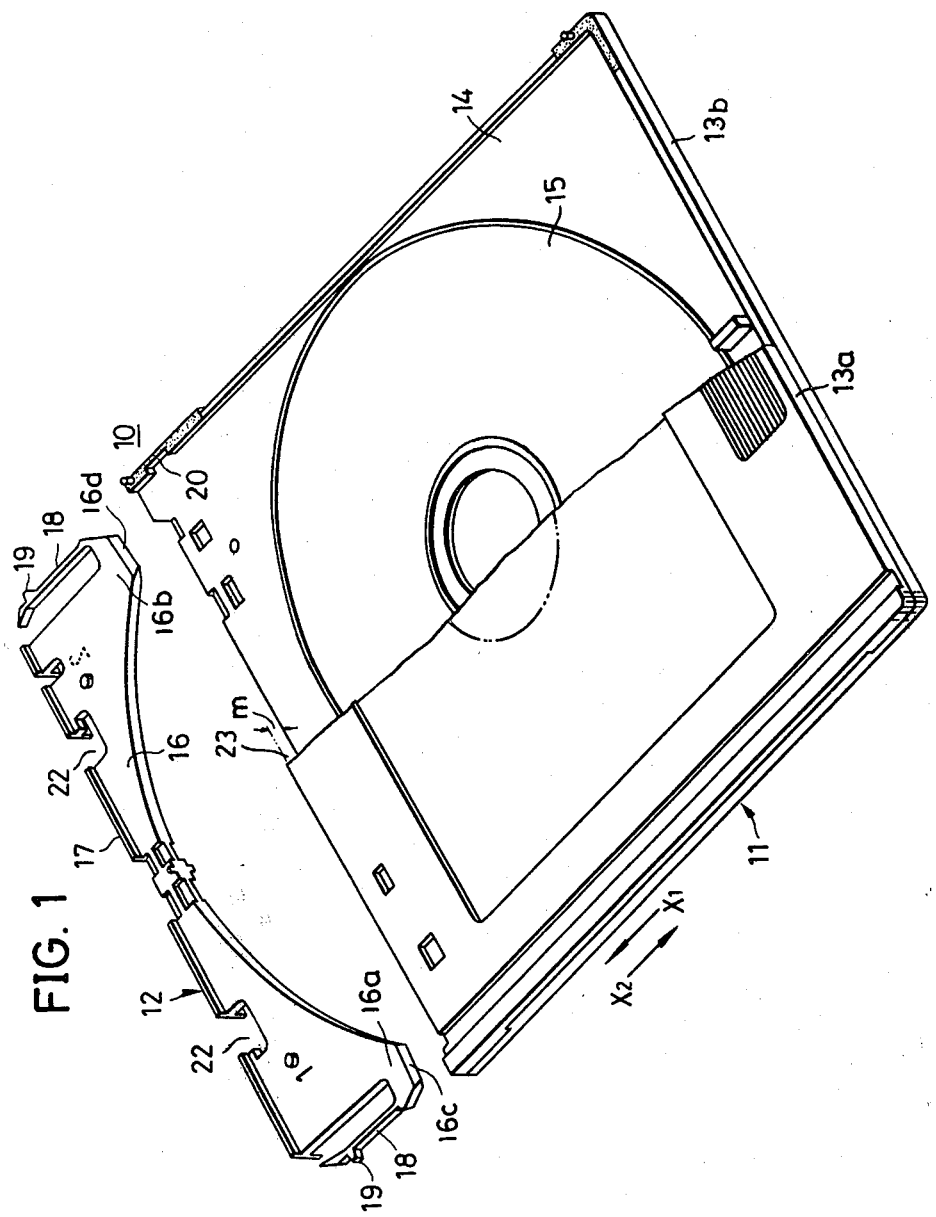
FIG. 1 is a perspective view, with a part cut away and disassembled, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13a and 13b, and comprises a flat cavity or space 14 therein. This space 14 is open at an opening 23 at the front side of the jacket 11, and accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
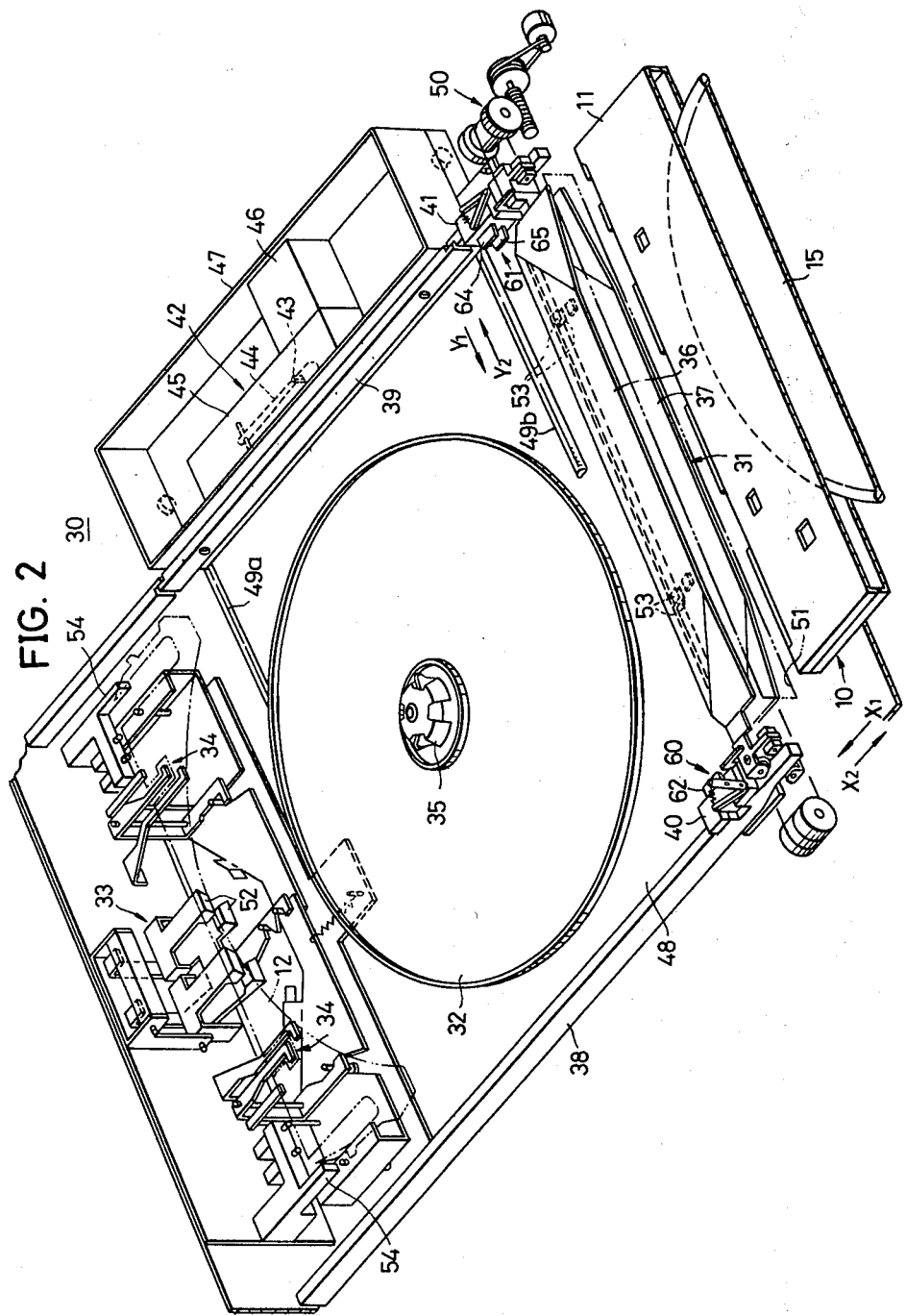
FIG. 2 is a perspective view, with a part cut away, showing the inner construction of an embodiment of a rotary recording medium reproducing apparatus according to the present invention.

As shown in FIG. 2, a reproducing apparatus 30 substantially comprises a jacket opening enlarging mechanism 31, a turntable 32 for rotating the disc 15 placed thereon, a disc holding mechanism 33 for holding the disc 15, a lid plate locking mechanism 34 for locking the lid plate 12, a lid member guiding mechanism 60 which forms an essential part of the apparatus according to the present invention.

The jacket opening enlarging mechanism 31 comprises upper and lower beams 36 and 37 extending in the directions of arrows Y1 and Y2, and sliders 40 and 41 fitted over guide rails 38 and 39 to support both ends of the above upper and lower beams 36 and 37.

A reproducing transducer 42 comprises a pickup device 45 including a cantilever 44 provided with a reproducing stylus 43 at the tip end thereof, a resonator 46, and the like, and is mounted to a carriage 47. The carriage 47 is transferred in the directions of the arrows Y1 and Y2 by means of a transferring mechanism 50, in a state where rollers provided on the carriage 47 roll along rails 49a and 49b respectively provided on a chassis 48.

The disc holding mechanism 33 is provided at the inner part of the reproducing apparatus 30 on the opposite side of an inserting opening 51, and comprises a pair of upper and lower holding fingers 52.

Upon reproduction of the disc 15, the disc case 10 is inserted through the inserting opening 51 of the reproducing apparatus 30, by inserting the disc case 10 with the side of the lid plate 12 into the direction of an arrow X1.

When the disc case 10 is inserted into the reproducing apparatus 30 in the above described state, the jacket opening enlarging mechanism 31 is pushed by the disc case 10, and moves in the direction of the arrow X1. Accordingly, the upper and lower beams 36 and 37 respectively rotate, and enlarging fingers 53 of the upper and lower beams 36 and 37 respectively move upwards and downwards to separate from each other. The tip ends of the enlarging fingers 53 respectively enlarge the front parts of the jacket halves 13a and 13b upwards and downwards, to enlarge the opening 23.

When the disc case 10 is inserted into the innermost part of the reproducing apparatus 30 together with the enlarging device 31 through the upper side of the turntable 32, cutouts 22 of the lid plate 12 is locked by the lid plate locking mechanism 34. Hence, the lid plate 12 is locked and held at the innermost part of the reproducing apparatus 30.

Furthermore, engagement releasing members 54 enter inside the openings on the right and left sides of the disc case 10, and push sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is held at a predetermined height by the holding fingers 52.

Next, the jacket 11 is pulled out in the direction of an arrow X2. Since the lid plate 12 and the disc 15 are respectively locked and held as described above, only the jacket 11 is moved in the direction of the arrow X2, leaving behind the lid plate 12 and the disc 15. Accompanied by this pulling out operation of the jacket 11, the lid plate 12 and the disc 15 are relatively pulled out from within the jacket 11. In a state where the jacket 11 is completely pulled out from the reproducing apparatus 30, the disc 15 is supported horizontally at a position directly above the turntable 32.

Next, when a play operation is performed, the disc 15 is lowered and placed onto the turntable 32, and is clamped by a disc clamping mechanism 35. In addition, the disc 15 is rotated towards a clockwise direction together with the turntable 32.

Moreover, the carriage 47 moves in the direction of the arrow Y1 from a waiting position, to reproduce the information signal by the reproducing stylus 43 which relatively scans the recording surface of the disc 15.

Next, an operation in which the disc 15 is recovered from within the reproducing apparatus 30, will now be described.

Upon completion of the reproducing operation, the disc 15 is pushed upwards. Further, the disc 15 which is pushed upwards, is held by the disc holding mechanism 33.

Upon recovering of the disc 15, an empty jacket 11 is again inserted into the reproducing apparatus 30 through the inserting opening 51, with the opening of the jacket 11 first. Thus, the enlarging device 31 is pushed by the jacket 11 as in the above case where the disc case 10 is inserted, and moves in the direction of the arrow X1, to enlarge the opening of the jacket 11. As the jacket 11 is inserted towards the direction of the arrow X1, the disc 15 is relatively inserted into the jacket 11 through the opening of the jacket 11.

When the jacket 11 is inserted into the innermost position inside the reproducing apparatus 30, the disc 15 becomes completely incased within the jacket 11, and furthermore, the locked lid plate 12 is relatively inserted within the opening of the jacket 11.

When the jacket 11 is inserted into a final position, the disc 15 is accommodated within the jacket 11, and the main part of the lid plate 12 which has been locked, is inserted inside the jacket opening. Further, the lid plate locking mechanism 34 releases the lid plate 12.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, description will be given with respect to an embodiment of a lid member guiding mechanism which forms as essential part of the present invention, with reference to FIGS. 3, 4A, 4B, and 4C.

Lid member guiding mechanisms 60 and 61 are respectively provided on the left and right sliders 40 and 41. The left lid member guiding mechanism 60 consists of a pair of guide pieces 62 and 63 respectively projecting from the inner side surface of the slider 40. On the other hand, the right lid member guiding mechanism 61 consists of a pair of guide pieces 64 and 65 respectively projecting from the inner side surface of the slider 41.

Since the construction of the left and right lid member guiding mechanisms 60 and 61 are the same, description will hereinafter be given with respect to the left lid member guiding mechanism 60.

In the left lid member guiding mechanism 60, the pair of guide pieces 62 and 63 are provided at the upper and lower part with a predetermined distance l formed therebetween, and provided at positions deviated from the jacket opening enlarging mechanism 31 towards the direction of the arrow X1. Accordingly, upon insertion of the jacket 11, the guide pieces 62 and 63 move at positions deviated from the opening 23 of the jacket 11 towards the direction of the arrow X1. The above predetermined distance l is selected to a value slightly larger than a vertical length m of the opening 23 in the jacket 11. Further, tapered surfaces 62a and 63a which spread out like an unfolded fan in the direction of the arrow X1, are respectively provided at the ends of the guide pieces 62 and 63 towards the direction of the arrow X1. A distance n between tip ends of the tapered surfaces 62a and 63a is selected to a value relatively larger than the above predetermined distance l. This distance n is determined by considering possible deviation from the horizontal position of an end part of the main lid body 16 of the lid plate 12.

Next, description will be given with respect to the operation of the lid member guiding mechanism 60 of the above described construction.

Figure 3:
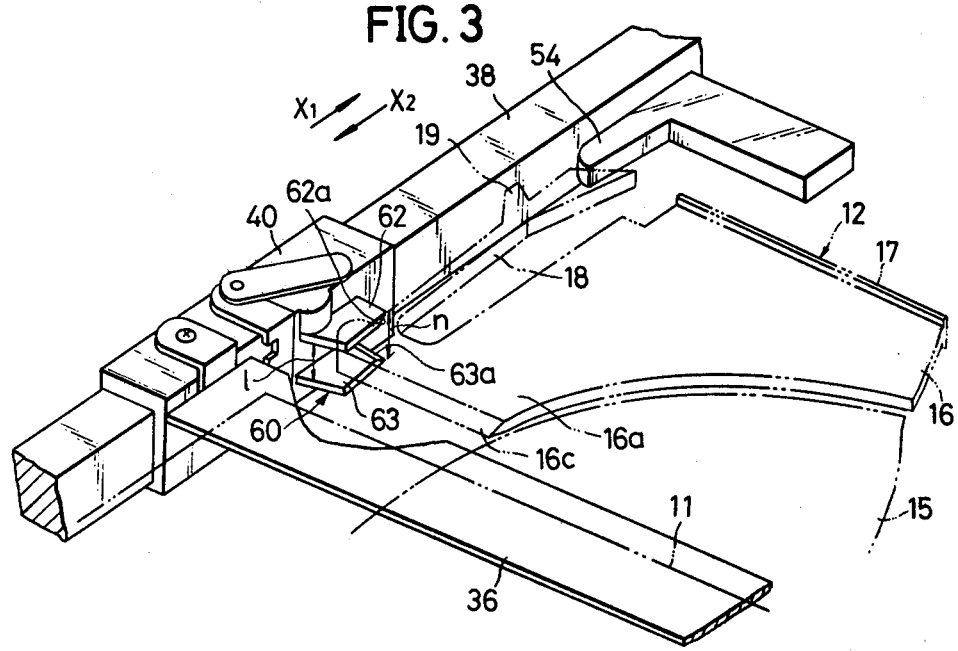
FIG. 3 is a perspective view showing an embodiment of a lid member guiding mechanism which forms an essential part of the rotary recording medium reproducing apparatus according to the present invention.

Upon completion of the disc reproducing operation, the lid plate 12 is locked at the innermost part of the reproducing apparatus 30 as indicated by two-dot chain lines in FIGS. 2 and 3. The edge part of the main lid body 16 on the other side of the rim portion 17 of the lid plate 12, is of an arcuate shape, and the right and left end sides of the main lid body 16 extend to the side of the turntable 32 (inserting opening 51). Hence, the lid plate 12 enters inside the empty jacket 11 inserted in the direction of the arrow X1, from the tip end sides of extending parts 16a and 16b of the main lid body 16. End portions 16c and 16d of the above extending parts 16a and 16b are respectively of tapered shapes.

Figure 4A:
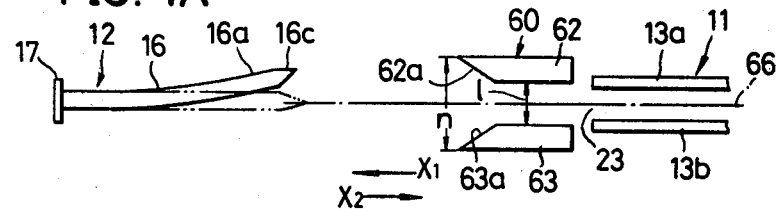
FIGS. 4A, 4B and 4C respectively are diagrams showing in steps the operational state of a lid member guiding mechanism, during an operation in which the lid member is guided into the opening of the jacket upon recovering of the rotary recording medium.

When the lid plate 12 is not curved due to curves introduced upon forming of the lid plate 12, and the lid plate 12 is locked in a normal state, the lid plate 12 is maintained on a jacket insertion path 66 indicated by a one-dot chain line, as indicated by a two-dot chain line in FIG. 4A. In this case, the lid plate 12 enters into the opening 23 of the jacket 11 even when the lid member guiding mechanism 60 is not provided.

In a case where the lid plate 12 is curved due to curves introduced upon forming of the lid plate 12 and the tapered end portion 16c is deviated towards the upward direction from the jacket insertion path 66 as shown in FIG. 4A, the front surface edge of the jacket 11 will hit against the tapered end portion 16c of the lid plate 12 unless the lid member guiding mechanism 60 is provided. Further, the jacket 11 will slip into the lower side of the lid plate 12. Accordingly, in this case, the jacket 11 and the lid plate 12 cannot be connected, and the disc 15 cannot be recovered into the jacket 11.

However, in the present embodiment of the invention, when the empty jacket 11 is inserted into the reproducing apparatus 30 in the direction of the arrow X1, the leading part of the lid member guiding mechanism 60 moves in the direction of the arrow X1 as shown in FIG. 4A. Accordingly, the lid member guiding mechanism 60 reaches a position opposing the tapered end portion 16c of the main lid body 16, before the opening 23 of the jacket 11 reaches the position opposing the tapered end portion 16c. Thus, the tapered end portion 16c of the main lid body 16 is guided by the lid member guiding mechanism 60, and the height position of the tapered end portion 16c is corrected.

Figure 4B:
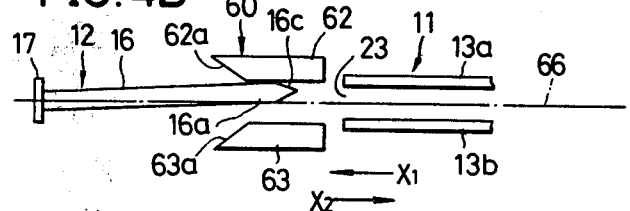
Figure 4C:
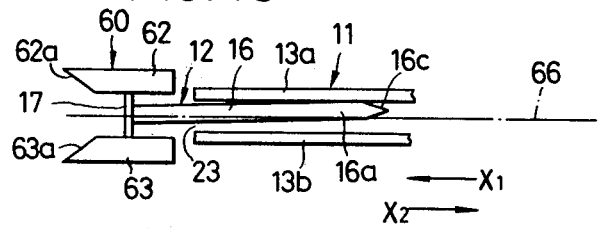

That is, the tapered surface 62a of the upper guide piece 62 hits against the tapered end portion 16c, and the tapered end portion 16c is accordingly guided along the tapered surface 62a and forcibly displaced downwards. Therefore, the tapered end portion 16c enters between the guide pieces 62 and 63 to be corrected in a substantially horizontal state, as shown in FIG. 4B. Accordingly, the lid plate 12 is in a state possible to enter into the jacket 11.

Although the opening 23 of the jacket 11 is enlarged in the above described state, the part of the opening 23 which opposes the tapered end portion 16c is a part in the vicinity of the left end of the opening 23, and the extent to which this left end part of the opening 23 is enlarged is small. However, at the point where the opening 23 of the jacket 11 reaches the tapered end portion 16c as the jacket 11 is inserted further towards the direction of the arrow X1, the position of the extending part 16a of the main lid body 16 is restricted between the upper and lower guide pieces 62 and 63. Accordingly, when the jacket 11 is inserted further towards the direction of the arrow X1, the tapered end portion 16c passes through the opening 23 and relatively enters into the jacket 11 due to the tapered surface of the tapered end portion 16c.

The entire main lid body 16 enters into the jacket 11 when the jacket 11 is further inserted, and the lid plate 12 is accordingly connected to the jacket 11.

The right lid member guiding mechanism 61 also operates in a similar manner as the left lid member guiding mechanism 60, and the main lid body 16 positively enters into the jacket 11 from the tapered end portion 16d of the extending part 16b.

In addition, when the tapered end portions 16c and 16d of the lid plate 12 are deviated towards the downward direction with respect to the jacket insertion path 66, the lower guide pieces 63 and 65 of the upper and lower guide pieces of the lid member guiding mechanisms 60 and 61 operate in a manner similar to the guide piece 62 in the above described case. Accordingly, the extending parts 16a and 16b are corrected to the height position of the jacket insertion path 66, before the opening 23 of the jacket 11 reaches a position opposing the tapered end portions 16c and 16d.

Further, this invention is not limited to these embodiments, but various variations and modifications may be made without departing from the scope of the invention.

What is claimed is:

1. Apparatus for reproducing information signals from a rotary recording medium accommodated within a case, said case having a jacket with a space for accommodating said rotary recording medium and an opening through which said rotary recording medium can enter and leave said jacket, and a lid member inserted through said opening of said jacket for closing said opening, said lid member having a locking edge and a pair of ends remote from said edge, said reproducing apparatus comprising:

means for defining an inserting opening through which said case or an empty jacket is inserted;

turntable means for rotating said rotary recording medium after it is left within said reproducing apparatus when an operation is performed in which said case is inserted into said reproducing apparatus and then said jacket is pulled from said reproducing apparatus;

lid member locking means located at an innermost part of said reproducing apparatus for locking and retaining said lid member within said reproducing apparatus when an operation is performed in which said case is inserted into said reproducing apparatus and then pulled out from said reproducing apparatus; and lid member guiding means for guiding said lid member locked by said lid member locking means and retained within said reproducing apparatus and for correcting the position of said lid member so that said lid member opposes the opening of said jacket at an intermediate point during an insertion of an empty jacket into said reproducing apparatus to recover said rotary recording medium within said reproducing apparatus into said jacket, said lid member guiding means comprising a pair of guide pieces each having an upper and a lower guide member for putting both ends of the locked lid member between said guide members and restricting upward and downward displacement of said lid member, by reason of said guide pieces moving and approaching the locked lid member from a vicinity of said inserting opening, in response to an operation in which the empty jacket is inserted into said reproducing apparatus through said inserting opening.

2. A rotary recording medium reproducing apparatus as claimed in claim 1 in which said pair of guide pieces are separated and provided with a predetermined distance therebetween, said predetermined distance being slightly larger than the length of said opening of said jacket in the upward and downward directions, and said guide pieces have tapered surfaces which spread out like an unfolded fan towards the inserting direction of said empty jacket at the front surface side thereof facing the inserting direction of said empty jacket.

3. A reproducing apparatus as claimed in claim 1 in which said lid member has extending parts at right and left end sides thereof, said parts extending towards the side of said inserting opening, and said lid member guiding means is located at right and left end sides of said inserting opening to act on said extending parts of said lid member.

4. A rotary recording medium reproducing apparatus as claimed in claim 1 which further comprises jacket opening enlarging means in the vicinity of said inserting opening and capable of moving over said turntable means between a position in the vicinity of said inserting opening and said innermost part of said reproducing apparatus, for enlarging said opening of the inserted empty jacket, said lid member guiding means being an integral part of said jacket opening enlarging means.

5. A reproducing apparatus for reproducing a rotary recording medium accommodated within a case, said case having a jacket with a space for accommodating said rotary recording medium and an opening through which said rotary recording medium can enter and leave said jacket, and a lid member inserted through said opening of said jacket for closing said opening, said reproducing apparatus comprising:

an inserting opening through which said case or an empty jacket is inserted;

a turntable for rotating said rotary recording medium left within said reproducing apparatus when an operation is performed in which said case is inserted into said reproducing apparatus and then said jacket is pulled out from said reproducing apparatus;

lid member locking means located at an innermost part of said reproducing apparatus for locking and leaving said lid member within said reproducing apparatus when an operation is performed in which said case is inserted into said reproducing apparatus and then pulled out from said reproducing apparatus;

lid member guiding means for guiding said lid member locked by said lid member locking means and left within said reproducing apparatus and correcting the position of said lid member so that said lid member opposes the opening of said jacket at an intermediate point of insertion of an empty jacket, when the empty jacket is inserted into said reproducing apparatus to recover said rotary recording medium within said reproducing apparatus into said jacket;

jacket opening enlarging means in the vicinity of said inserting opening and being capable of moving over said turntable between a position in the vicinity of said inserting opening and said innermost part of said reproducing apparatus, for enlarging said opening of the inserted empty jacket, said lid member guiding means being located at a part of said jacket opening enlarging means;

said jacket opening enlarging means having slider members which are freely movable along guide rails located on both sides of an inserting path of said jacket, and enlarging members provided horizontally and supported between said slider members by said slider members at both ends thereof, said lid member guiding means consisting of a pair of upper and lower guide pieces, and said guide pieces projecting on the inner side surfaces of said slider members.

* * * * *